(12) United States Patent
Tashiro et al.

(10) Patent No.: US 8,139,316 B2
(45) Date of Patent: Mar. 20, 2012

(54) DISK DRIVE DEVICE HAVING AIRTIGHT STRUCTURE WITH IMPROVED AIRTIGHTNESS

(75) Inventors: Tomoyuki Tashiro, Shizuoka (JP); Yoji Furui, Hyogo-Ken (JP)

(73) Assignee: Alphana Technology Co., Ltd., Fujieda-shi, Shizuoka (JP)

( * ) Notice: Subject to any disclaimer, the term of this patent is extended or adjusted under 35 U.S.C. 154(b) by 338 days.

(21) Appl. No.: 12/486,638

(22) Filed: Jun. 17, 2009

(65) Prior Publication Data

US 2009/0316299 A1 Dec. 24, 2009

(30) Foreign Application Priority Data

Jun. 24, 2008 (JP) ................................. 2008-164999

(51) Int. Cl.
*G11B 33/14* (2006.01)
(52) U.S. Cl. .................. 360/97.02; 360/99.08
(58) Field of Classification Search ............... 360/97.02, 360/97.03, 99.04, 99.08, 98.07
See application file for complete search history.

(56) References Cited

U.S. PATENT DOCUMENTS

| | | | | | |
|---|---|---|---|---|---|
| 4,233,619 | A | * | 11/1980 | Webb et al. | 257/680 |
| 5,706,579 | A | * | 1/1998 | Ross | 29/840 |
| 6,438,826 | B2 | * | 8/2002 | Takase et al. | 29/855 |
| 6,759,266 | B1 | * | 7/2004 | Hoffman | 438/64 |
| 6,797,541 | B2 | * | 9/2004 | Chun et al. | 438/111 |
| 6,970,326 | B2 | * | 11/2005 | Watanabe | 360/244.1 |
| 7,137,563 | B2 | * | 11/2006 | Shibamoto et al. | 235/487 |
| 7,973,440 | B2 | * | 7/2011 | Narita et al. | 310/90 |
| 2003/0099065 | A1 | * | 5/2003 | Watanabe | 360/244.1 |
| 2006/0284920 | A1 | * | 12/2006 | Iwata | 347/19 |
| 2008/0074830 | A1 | * | 3/2008 | Kurasawa | 361/681 |
| 2008/0246810 | A1 | * | 10/2008 | Shimamura | 347/50 |
| 2010/0329104 | A1 | * | 12/2010 | Yawata et al. | 369/264 |

FOREIGN PATENT DOCUMENTS

| | | | | |
|---|---|---|---|---|
| JP | 59164335 | A | * | 9/1984 |
| JP | 63072739 | A | * | 4/1988 |
| JP | 07053870 | A | * | 2/1995 |
| JP | 07220559 | A | * | 8/1995 |
| JP | 11-299168 | | | 10/1999 |
| JP | 2001-298890 | | | 10/2001 |
| JP | 2006-187145 | | | 7/2006 |

OTHER PUBLICATIONS

JP 2001-298890 to Hoffman et al, partial English translation; 10 pages.*
JP 07-220559 to Ishikawa et al, partial English translation, 6 pages.*

* cited by examiner

*Primary Examiner* — Brian Miller
(74) *Attorney, Agent, or Firm* — Fulwider Patton LLP

(57) ABSTRACT

A disk drive device is configured such that a wall of a base plate is provided with a through hole that guides a lead from a drive unit outside. The through hole is covered by a sealing sheet having an insertion hole. The lead is guided from inside the housing via the insertion hole of the sealing sheet. The sealing sheet carries a curable resin. The curable resin, temporarily softened during a curing process, flows into a space between the base plate and the through hole and a space between the insertion hole and the lead. The curable resin is cured in this state, ensuring the airtightness of the housing.

11 Claims, 5 Drawing Sheets

DISK DRIVE DEVICE HAVING AIRTIGHT STRUCTURE WITH IMPROVED AIRTIGHTNESS

CROSS-REFERENCES TO RELATED APPLICATIONS

This application claims priority from Japanese Application No. 2008-164999, filed Jun. 24, 2008 incorporated by reference in its entirety.

BACKGROUND

1. Field of the Invention

The present invention relates to disk drive devices and, more particularly, to improvement in the airtight structure of disk drive devices.

2. Description of Related Art

Recently, there has been a rapid development in the technology for improving the recording density of a fixed disk drive device (hereinafter, simply referred to as a disk drive device). In association with this, the recording capacity has been increased dramatically. In association with the improvement in the recording density, measures against the invasion of foreign materials into a disk drive device have become a concern. For example, the distance between the surface of a recording disk accommodated inside a disk drive device and the magnetic head is on the order of several nanometers. In contrast, the size of dust etc. in the air is far larger so that the dust invading the disk drive device may cause failure of the magnetic head to access the recording disk or cause a physical damage to the recording disk or the magnetic head. For this reason, the housing of the disk drive device needs to have a sealed structure. Meanwhile, the disk drive device accommodates a motor for driving the recording disk into rotation, and a magnetic head. Thus, there is a need to guide leads for feeding power to a magnetic coil of the motor or signal leads of the magnetic head outside the disk drive device. The leads are guided outside via a through hole formed in a part of the housing of the disk drive device. As mentioned above, the housing needs to have a sealed structure. Therefore, the portion of the device where the lead is guided through needs to be highly airtight in order to prevent air leak.

Various structures for ensuring the airtightness of the housing are proposed. Known such structures include a structure wherein a seal is placed in the through hole portion and a sealant is applied on the portion, a structure where a plug hole is sealed by solder, a structure where a bush is placed in the through hole and the hole is sealed by applying a plurality of types of adhesives.

However, the sealant, solder, and adhesive all have fluidity and can easily run in the process of coating and curing. Disadvantageously, this is likely to cause variation in the condition of sealing, causing product to product variation, and resulting in the unstable airtight performance in the through hole portion. The related-art approach is also disadvantageous in that it requires the addition of a structure for minimizing the flow of whatever is applied or the addition of a step that allows for flowability, resulting in an increase in the manufacturing cost.

SUMMARY OF THE INVENTION

The present invention addresses these disadvantages and a purpose thereof is to provide a disk drive device capable of achieving stabilization of airtightness of the housing having a through hole, using a simple structure.

A disk drive device according to one embodiment of the present invention comprises: a housing; a bearing unit provided in the housing and operative to rotatably support a recording disk with respect to the housing; and a drive unit operative to drive the recording disk supported by the bearing unit into rotation, wherein the housing is provided with a through hole that guides a lead from the drive unit outside the housing, and a sealing sheet formed with an insertion hole for guiding the lead is used to seal the insertion hole and the through hole so as to form a closed space in the housing, the sealing sheet carrying a curable resin temporarily softened during a curing process and is cured afterwards.

The base of the sealing sheet is formed as a sheet made of a fibrous material or a resin material and has the function of carrying a curable resin. The sealing sheet may be formed by weaving a fibrous material or a resin material into a mesh. The roughness formed by the mesh structure may carry the curable resin. The curable resin may be immersed in the fibers forming the sheet. The sealing sheet may be formed as a plate adapted to carry the curable resin on its surface. The diameter of the insertion hole formed in the sealing sheet may sized to correspond to the diameter of the lead inserted. The curable resin carried by the sealing sheet is temporarily softened during a curing process and flows into the insertion hole through which the lead is guided so as to fill a gap between the lead and the insertion hole. When the base of the sealing sheet is permeable to air due to a mesh structure or fiber, temporary softening of the curable resin during a curing process acts to fill the portions permeable to air. A curable resin characterized by transition between two phases, i.e. a resin softened during a curing process and cured afterwards, may be used.

According to this embodiment, the curable resin carried by the sealing sheet is temporarily softened during a curing process and flows into the gap between the lead and the insertion hole, filling the gap accordingly. The temporarily softened curable resin also flows into the portion of contact between the sealing sheet and the through hole, filling the gap therebetween. The curable resin carried by the sealing sheet flows toward a portion where the gap exists. When the gap is filled, the flow is discontinued so that the resin remains on the sealing sheet and is cured in that state, ensuring the airtightness of the housing. The size of the insertion hole and the through hole, and the volume of the lead inserted therethrough determine the gap created and also determine the volume of curable resin that flows. Accordingly, the condition of sealing by the curable resin does not vary from product to product, and the airtightness of the disk drive device is stabilized.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

The invention will now be described by reference to the preferred embodiments. This does not intend to limit the scope of the present invention, but to exemplify the invention.

The disk drive device according to the embodiment is configured such that the housing wall of the device is provided with a first guide. The first guide is a through hole that guides a lead from a driving unit outside. The through hole is covered by a sealing sheet having an insertion hole. The insertion hole is a second guide. The lead is guided from inside the housing via the insertion hole of the sealing sheet. The sealing sheet carries a curable resin. The curable resin, temporarily softened during a curing process, flows into a space between the housing and the through hole and a space between the insertion hole and the lead. The curable resin is cured in this state, ensuring the airtightness of the housing.

Figure 1:
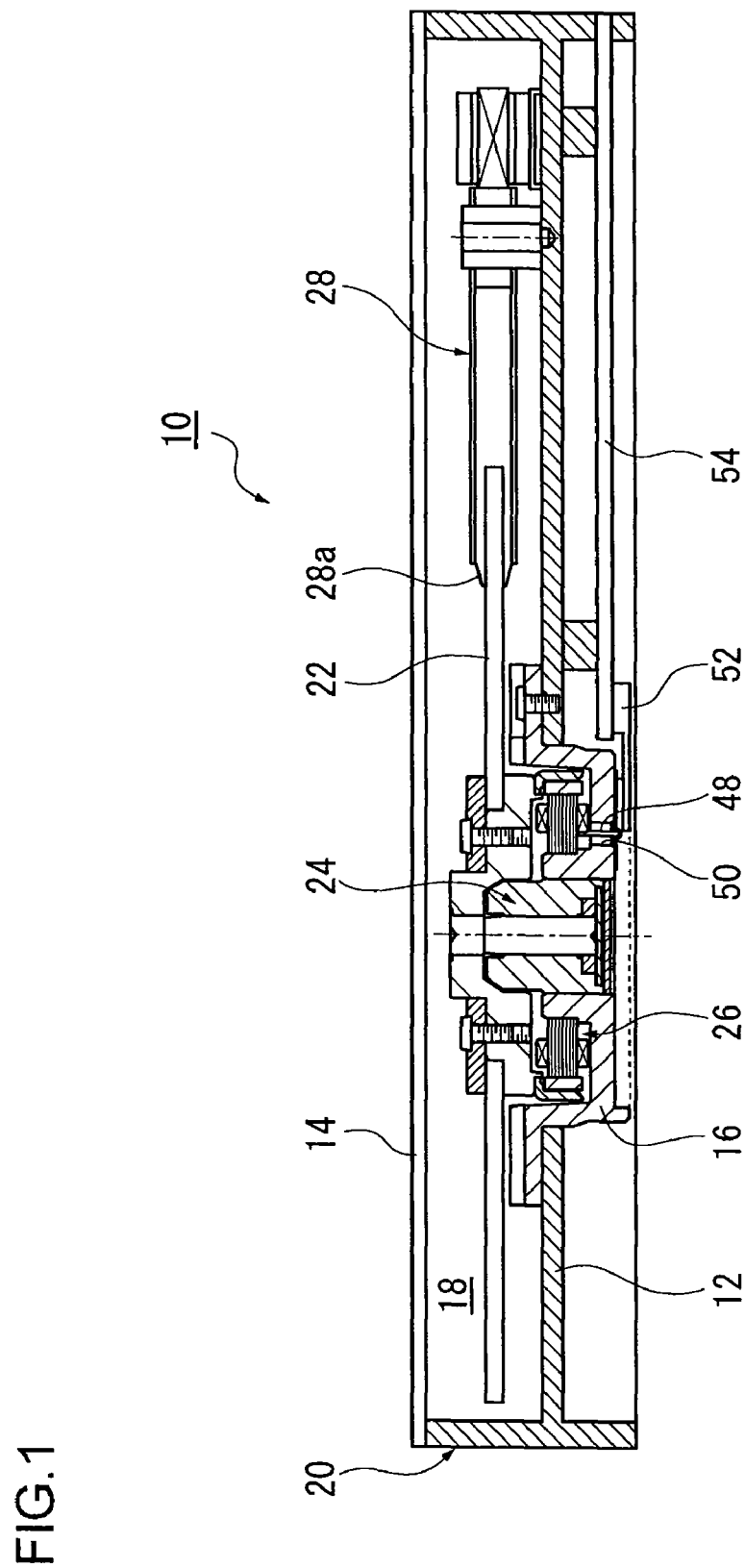
FIG. 1 is a schematic section showing the overall structure of a disk drive device according to an embodiment of the present invention.

FIG. 1 is a schematic section showing the overall structure of a disk driver device 10 according to the embodiment.

The disk driver device 10 includes a chassis 12 having a substantially concave cross section and made of a metal such as aluminum, a cover 14 covering the depression of the chassis 12 and made of, for example, a metal, and a housing 20 that defines a closed space 18 with a base plate 16 supporting a bearing unit descried later. A recording disk 22 (a magnetic recording medium) is rotatably supported by a bearing unit 24 in the closed space 18 of the housing 20. A drive unit 26 for driving the recording disk 22 into rotation is connected to the bearing unit 24. Inside the housing 20 is provided a head unit 28 for writing and reading data in the recording disk 22 while swinging a magnetic head 28a in the radial direction of the recording disk 22 in rotation.

Figure 2:
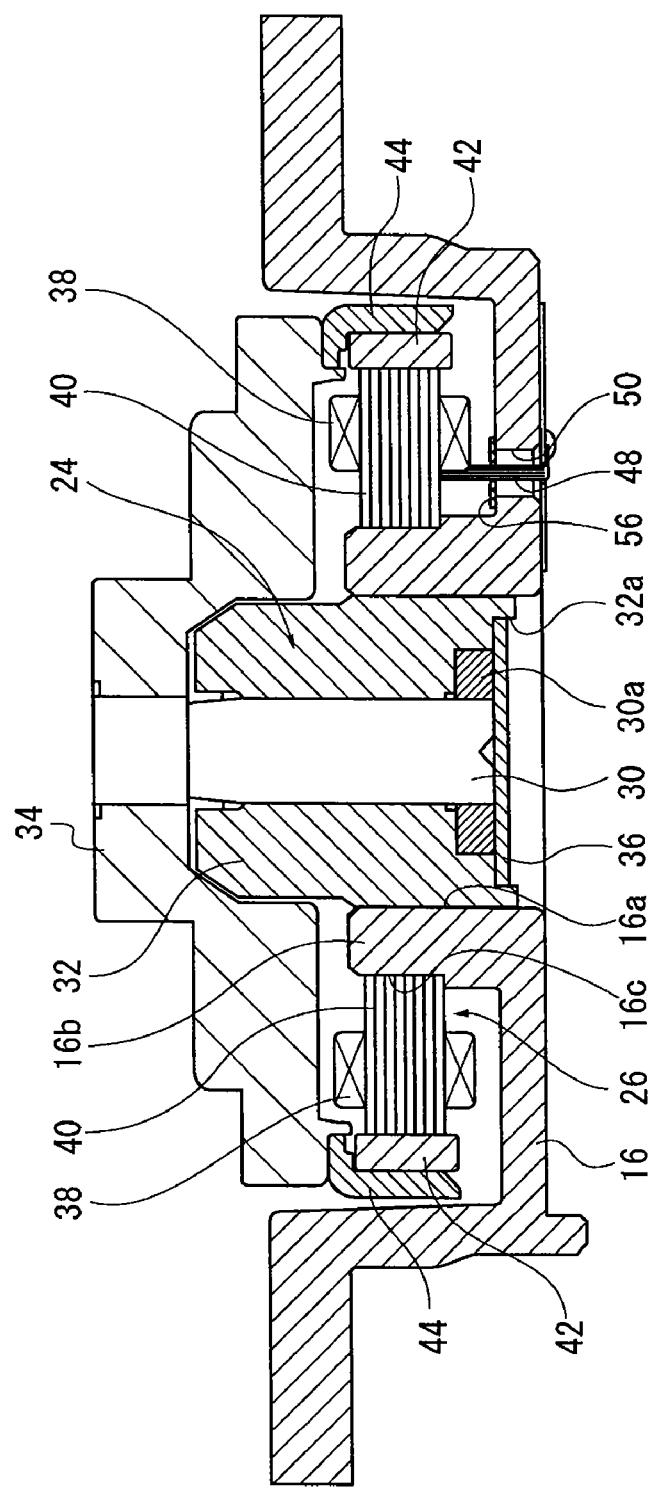
FIG. 2 is an enlarged section of a bearing unit and a driving unit located inside a housing according to the embodiment.

FIG. 2 is an enlarged section of the bearing unit 24 and the driving unit 26 located inside the housing 20.

The bearing unit 24 comprises a shaft 30, a sleeve 32, a hub 34, and a counter plate 36. The base plate 16 constituting the housing 20 is provided with a circular opening 16a. The substantially cylindrical sleeve 32 is inserted in the circular opening 16a. In the case of FIG. 2, the sleeve 32 is secured to the inner wall of the circular opening 16a using, for example, an adhesive. The shaft 30 is rotatably accommodated in the cylindrical space of the sleeve 32. The hub 34 is secured to one end of the shaft 30 and a flange 30a for applying a dynamic pressure is provided at the other end of the shaft 30. A circular opening 32a of the sleeve 32 is sealed by the counter plate 36 to prevent the shaft 30 from being coming loose and to maintain the closed space 18 air tight. The recording disk 22 is secured to the hub 34.

A stator core 40 is secured to an outer surface 16c of a cylindrical wall 16b defining the circular opening 16a of the base plate 16. A plurality of coils 38 for generating a magnetic field are wound around the stator core 40. A rotor yoke 44 for supporting a magnet 42 is secured to the hub 34, which is secured to the shaft 30, such that the stator core 40 and the magnet 42 face each other. The stator core 40 and the magnet 42 face each other across a small gap. By feeding a current commensurate with the rotational position of the magnet 42 in the coils 38, the hub 34 can be rotated accordingly. In other words, the magnet 42, the rotor yoke 44, the hub 34, and the shaft 30 function as a rotor that rotates the recording disk 22 at a predetermined speed and in a predetermined direction.

The bearing unit 24 used in the embodiment is called a dynamic bearing. As described above, the flange 30a is formed at, for example, the end of the shaft 30. The space defined by the shaft 30, the flange 30a, the sleeve 32, and the counter plate 16 is filled by lubricant oil. Herringbone grooves are provided at a plurality of axially displaced locations on the inner surface of the sleeve 32 and on the end faces of the flange 30a. Therefore, the lubricant oil undergoes a high pressure as the flange 30a is rotated along with the shaft 30. The pressure causes the shaft 30 and the flange 30a to be removed from the wall surfaces around, placing the shaft 30 in substantially non-contact rotation. Thereby, the recording disk 22 is rotated at a high speed in a stable manner, allowing data to be written and read in a stable manner.

A through hole 50 that guides a lead 48 from the coils 38 outside the housing 20 is formed in a part of the base plate 16. The lead 48 led outside the through hole 50 is connected to a circuit board 54 via a connector 52. Power is supplied and signals are exchanged via the lead 54 as necessary.

The requirement for air-tight structure of the disk drive device 10 remains unchanged even in the case that the through hole 50 is provided. In the case of the embodiment, a sealing sheet 56 carrying a curable resin is used to maintain airtightness where the through hole 50 is formed.

Figure 3:
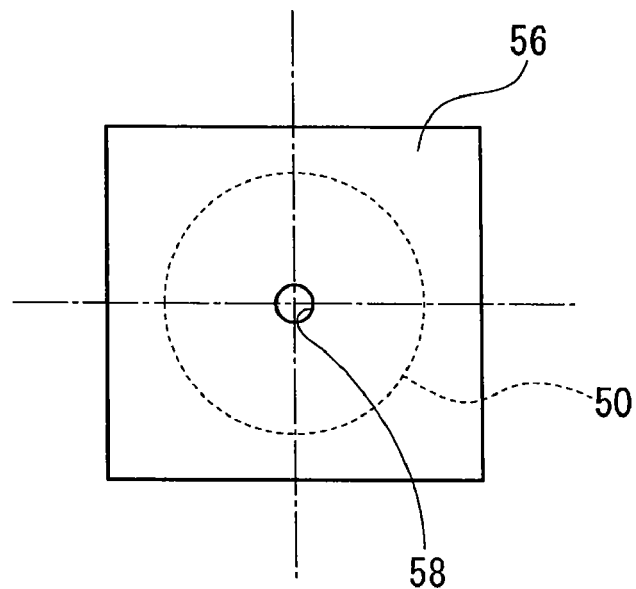
FIG. 3 is a top view showing an exemplary shape of a sealing sheet used in the disk drive device according to the embodiment.

FIG. 3 is a top view showing an exemplary shape of the sealing sheet 56. The sealing sheet 56 comprises a sheet base made of a fibrous material or a resin material, and a curable resin carried by the base. The base may be formed by weaving a fibrous material or a resin material into a mesh or a plate. Advantages obtained by forming the base as a mesh include improved flexibility, improvement in ease of handling, improvement in intimacy of contact with the through hole 50, and improvement in the capability of carrying a curable resin. A chemical fiber such as nylon, vinyl chloride, or polyester can be used as the base of the sealing sheet 56. A insertion hole 58 for letting the lead 48 through is formed in the sealing sheet 56. This insertion hole 58 can be punched by, for example, press working. Preferably, the insertion hole 58 is sized in accordance with the wire diameter of the lead 48 inserted. For example, the insertion hole 58 may be formed with a diameter corresponding to the diameter of a single lead 48. When a plurality of leads 48 are bundled for insertion into the insertion hole 58, the diameter of the insertion hole 58 may be adapted to the number of leads bundled. When the base of the sealing sheet 56 has elasticity due, for example, to a mesh form, the diameter of the insertion hole 58 may be slightly smaller than the wire diameter of the lead 48 inserted. In this case, the lead 48 inserted into the insertion hole 58 will be allowed to widen the insertion hole 58 so as to minimize a gap created between the insertion hole 58 and the lead 48.

The curable resin carried by the base of the sealing sheet 56 is softened temporarily during a curing process, flows into the insertion hole 58 into which the lead 48 is inserted, filling the space between the lead 48 and the insertion hole 58. Thereafter, the resin is cured in the final step of the curing process. Thermosetting resin may be used as a curable resin. For example, epoxy resin, acrylic resin, polyurethane resin, polyester resin, or polyimide resin may be used. The curable resin may be supported by the mesh structure of the base or supported by immersing the resin in the fibers of the base itself. Alternatively, the resin may be supported by coating the surface of the base with the resin. The base may be provided with roughness to facilitate the carrying of the curable resin.

Figure 4:
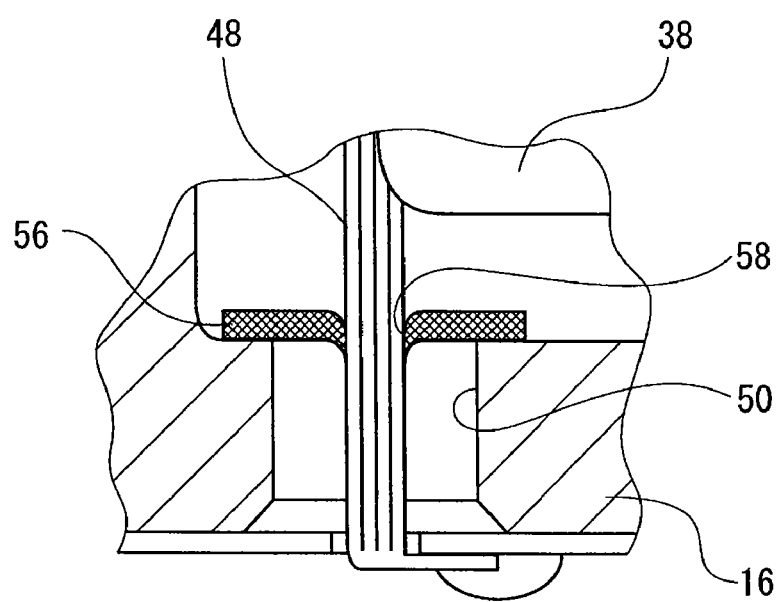
FIG. 4 shows how the sealing sheet used in the disk drive device according to the embodiment is installed in an insertion hole.

FIG. 4 shows how the sealing sheet 56 is placed in the insertion hole 50 formed in the base plate 16. In the example of FIG. 4, the sealing sheet 56 is placed at the end of the through hole 50 facing the interior of the housing 20. A plurality of leads 48 are bundled and inserted into the insertion hole 58. While the sealing sheet 56 is placed in this state, a curing process is performed under certain temperature control. This will initially soften the thermosetting resin carried by the sealing sheet 56, causing it to flow toward a gap in the neighborhood. For example, the resin will flow so as to fill the space between the lead 48 and the insertion hole 58. When the base of the sealing sheet 56 is permeable to air due to a mesh structure or fiber, temporary softening of the curable resin acts to fill the portions permeable to air. The temporarily softened curable resin also flows into the portion of contact between the sealing sheet 56 and the through hole 50, filling the gap therebetween. The thermosetting resin carried by the sealing sheet 56 flows toward a portion where the gap exists. When the gap is filled, the flow is discontinued so that the resin remains on the sealing sheet 56. As the curing process proceeds in this state, the thermosetting resin is completely cured, sealing the gap created in relation to the through hole 50 and maintaining the airtightness of the interior of the housing 20 by preventing air leak in the through hole 50. Since the thermosetting resin remains carried by the base of the sealing sheet 56 and maintains appropriate permeability during the curing process, the resin will not flow more than necessary or will not come loose. Therefore, formation of holes that would cause air leak in the process of curing is minimized. The size of the insertion hole 58 and the through hole 50, and the volume of the lead 48 inserted therethrough determine the gap created and also determine the volume of curable resin that flows. Accordingly, the condition of sealing by the curable resin does not vary from product to product, the airtightness of the disk drive device 10 is stabilized, and the quality is improved.

FIG. 4 shows that the sealing sheet 56 is placed toward the interior of the housing 20, i.e., inside the space defined by the base plate 16. The same advantage as described above is also obtained by placing the sealing sheet 56 outside the hosing 20, i.e., on the outer surface of the base plate 16. In this case, the condition of the sealing sheet 56 occurring after the curing process can easily be visually inspected, facilitating the inspection of airtightness and the installation of the sealing sheet 56.

A product called Super Epoxy Tape No. 1520 commercially available from Sumitomo 3M Limited may be used to form the sealing sheet 56.

It is preferable that the sealing sheet 56 be placed such that the center of the insertion hole 58 corresponds to (more specifically, aligned with) the center of the through hole 50 of the base plate 16, as shown in FIG. 3. As mentioned before, the base plate 16 is often made of a metal. Therefore, insulation should be a consideration in guiding the lead 48 outside. By placing the sheet such that the center of the through hole 50 corresponds to or is aligned with the center of the insertion hole 58, it is ensured that the lead 48 inserted into the through hole 50 is removed from the inner walls of the through hole 50 at equal distances. In other words, the lead 48 can be guided outside while maintaining the state of non-contact with the inner wall of the through hole 50. This can ensure insulation between the base plate 16 and the lead 48 and prevent short circuit between the lead 48 and the base plate 16. It will also minimize external forces derived from, for example, vibration from being directly exerted from the base plate 16 on the lead 48 and will eliminate the stress on the lead 48.

When a plurality of leads 48 are inserted into the insertion hole 58, the insertion hole 58 functions as a bundling means that bundles a plurality of leads 48 while maintaining insulation with respect to the base plate 16. Accordingly, routing of the leads 48 is facilitated. The use of the sealing sheet 56 also eliminates the need for an insulating tube fitted to the lead 48 conventionally.

FIGS. 5A-5H show other examples of the installation of the sealing sheet according to the embodiment.

Figure 5A:
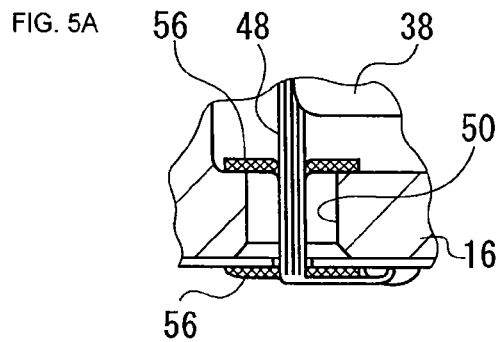
FIGS. 5A-5H show other examples of the installation of the sealing sheet, used in the disk drive device according to the embodiment, in an insertion hole.

FIG. 5A shows an example where the sealing sheet 56 is placed at the upper and lower ends of the through hole 50, i.e., inside and outside the housing 20. The same sealing sheet 56 may be used at the upper and lower ends. This will improve the reliability of airtightness of the housing 20 and also improve the reliability in the securing of the lead 48 by inserting the lead 48 into the two sealing sheets 56 and securing the lead accordingly.

Figure 5E:
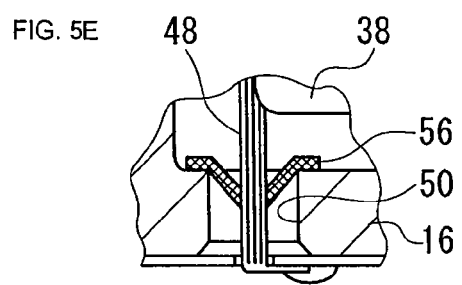
Figure 5B:
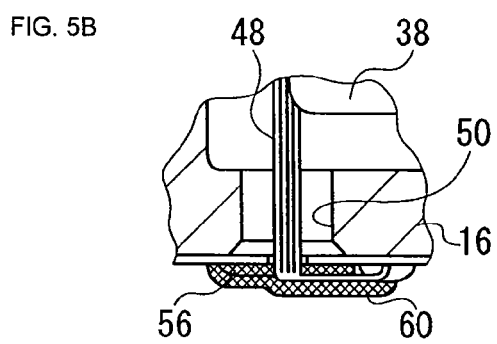

FIG. 5B shows that a single sealing sheet 56 is placed on the outer surface of the base plate 16 and a cover sealing sheet 60 carrying a curable resin is placed to cover the sealing sheet 56 and a part of the lead 48 guided outside the sealing sheet 56. The curable resin carried by the sheet 60 is softened temporarily during a curing process and is cured afterwards. The same material as used in the sealing sheet 56 may be used for the base of the sheet 60 and for the curable resin carried by the sheet 60, except that the insertion hole 58 is not provided in the sheet 60. When the diameter of the bundle of a plurality of leads 48 is large or when the wire diameter of individual leads 48 is large, the gap between leads may be large or the gap from the insertion hole 58 may grow. In this case, the reliability of airtightness of the housing 20 is improved by using the cover sealing sheet 60 to cover the sealing sheet 56 and a part of the lead 48. Further, the condition of the sealing sheet 56 and the cover sealing sheet 60 occurring after the curing process can easily be visually inspected so that the reliability of airtightness of the housing 20 is improved. Since the cover sealing sheet 60 secures the lead 48 guided outside the through hole 50 to the outer surface of the base plate 16, the sheet 60 contributes to the improvement in the performance of maintaining and securing the lead 48 in place.

Figure 5F:
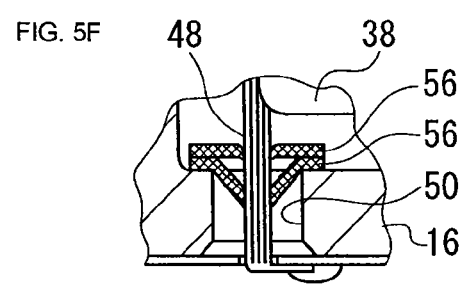
Figure 5C:
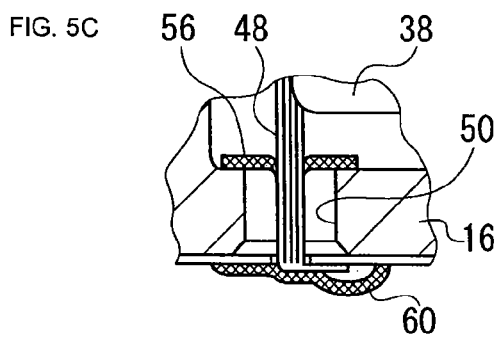

FIG. 5C shows an example where the sealing sheet 56 and the cover sealing sheet 60 are used such that the sealing sheet 56 is placed on the inner surface of the base plate 16 and the cover sealing sheet 60 is placed on the outer surface of the base plate 16. The arrangement of FIG. 5C also helps improve the reliability in airtightness of the housing 20.

Figure 5G:
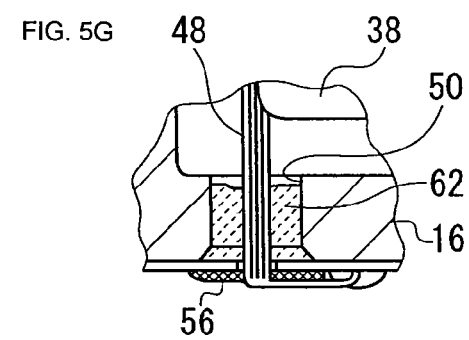
Figure 5D:
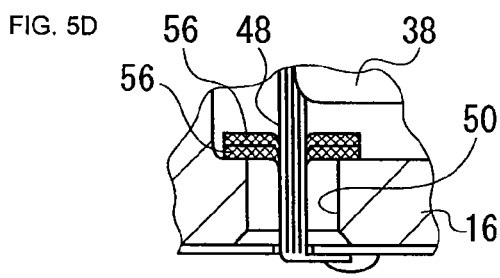

FIG. 5D shows an example of using a stack of two sealing sheets 56 placed on the inner surface of the base plate 16. By increasing the thickness of the sealing sheet 56 and increasing the area of contact between the lead 48 and the sealing sheet 56, the airtightness of the housing 20 is improved. Since a stack of two sheets is placed, working efficiently is improved.

FIG. 5E shows an example where the sealing sheet 56 is formed in conformity with the shape of the through hole 50. By forming the sheet 56 in conformity with the shape of the through hole 50, the intimacy of contact between the sealing sheet 56 and the through hole 50 or between the sheet 56 and the base plate 16 is improved so that the reliability of airtightness of the housing 20 is improved accordingly. It also improves the precision of positioning the sealing sheet 56 with respect to the through hole 50, effectively prevents the contact between the lead 48 and the inner wall of the through hole 50, and improves the reliability of insulation.

FIG. 5F shows an example where a planar sealing sheet 56 is added to the structure of FIG. 5E. In this case, the reliability of airtightness of the housing 20 is improved, the precision of positioning the sealing sheet 56 with respect to the through hole 50 is improved, the precision of positioning the lead 48 is improved, and the reliability of insulation is improved.

FIG. 5G illustrates the measures taken when an out-gas from the curable resin carried by the sealing sheet 56 is a concern. Inflow of an out-gas from the sealing sheet 56 into the interior of the housing 20 is prevented by performing, for sealing of the housing 20, a curing process while placing the sealing sheet 56 outside the through hole 50 and outside the motor, and then injecting a filler 62 characterized by little out-gas into the through hole 50. The use of such a filler 62 increases the options for materials forming the curable resin used in the sealing sheet 56, allowing the choice of the sealing sheet 56 with a high sealing performance in preference to other types of sheets and improving the reliability in airtightness of the housing 20.

Figure 5H:
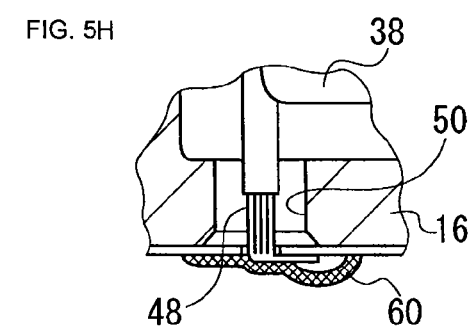

FIG. 5H is a reference example where only the cover sealing sheet 60 is placed on the outer surface of the base plate 16. In this case, the through hole is sealed with ease and the reliability of airtightness of the housing 20 is improved with ease.

For the purpose of avoiding the contact between the lead 48 and the inner wall of the through hole 50, the most advantageous location of the sealing sheet 56 will be the interior of the housing 20 because the position of the lead 48 is established before inserting the lead 48 into the through hole 50. On the other hand, when the diameter of the through hole 50 is large or when the distance of the lead 48 guided outside is so short that the contact with the inner wall of the through hole 50 will not occur even considering the variation in the way leads are routed, it will be most advantageous to locate the sheet 56 outside the through hole 50 given that it is desired to put weight on the ease of inspection of the curing process and of the resultant airtightness. The location of the sealing sheet 56 and the cover sealing sheet 60 is selected as appropriate depending on the form and size of the through hole 50, the number of leads 48, the wire diameter of the lead, etc. In either case, the aforementioned advantage is equally available.

Figure 6A:
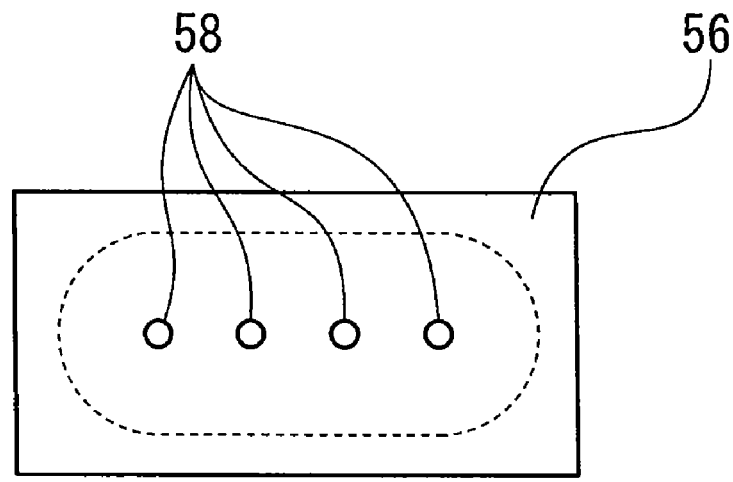
FIGS. 6A and 6B show other exemplary shapes of the sealing sheet used in the disk drive device according to the embodiment.
Figure 6B:
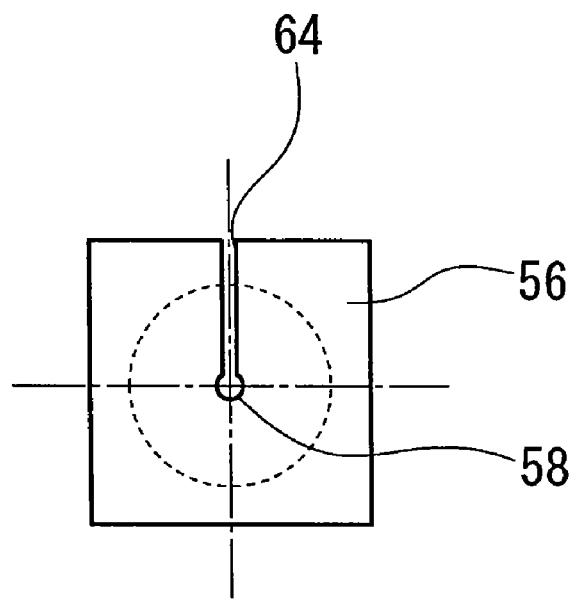

FIGS. 6A and 6B show variations of the sealing sheet 56. FIG. 6A shows an example where a plurality of insertion holes 58 are formed in a single sealing sheet 56. Different insertion holes 58 are used for different types of leads 48. A sensorless driving method that does not require the use of a Hall device, etc. is employed in the spindle motor used in the disk drive device according to the embodiment. According to the method, the direction of rotation of the motor is identified by detecting the order in which the U-phase, V-phase, and W-phase occur in relation to the neutral point. Therefore, the beginning of the winding for U-phase, V-phase, and W-phase is guided outside without routing the wire to a winding at another location. The neutral point is guided outside via a terminal without routing. By guiding the leads 48 of the respective phases through respective insertion holes 58 as shown in FIG. 6A, errors in routing the wire to external connectors or external devices are prevented. As a result, troubles such as rotation failure or reverse rotation is prevented.

By guiding the leads 48 of the respective phases through respective insertion holes 58, the balance of windings in the slots of the stator core 40 is improved. To produce a rotating magnetic field using the stator core 40, the coils 38 for different phases including, for example, a U-phase, V-phase, and W-phase are arranged in the circumferential direction. The wirings in the coils 38 for each phase are connected in series. Thus, the end of wiring for forming each phase in the coils 38 occurs in each of the U-phase slots, V-phase slots, and W-phase slots. The beginnings of the wirings in each phase in the coils 38 are electrically connected to form a neutral point. Therefore, to guide the wirings through the insertion hole 58 at one location, terminal connections of the wirings is required whereby the beginnings of the wirings are connected across slots, and the ends of the wirings are connected across slots, so that the wirings are brought to one location, while avoiding interference between wirings and other components, sandwiching of wirings by other components, or occurrence of poor insulation. Since the end of wiring from a given phase should be routed across a slot of a different phase, the wiring from a phase near the insertion hole 58 extends over a length different from the length that the wiring away from the insertion hole 58 extends. As a result, the balance of windings in the slots becomes relatively poor, resulting in electromagnetic property different from phase to phase. This results in poor torque balance between the phases and increase in vibration and noise. Also, the mutual inductance balance may be lost and the prevision in detecting the direction of rotation at the time of starting the motor may suffer. Further, complex wire routing increases the steps for manufacturing. In contrast, the arrangement of guiding the leads 48 for the respective phases from the respective insertion holes 58 eliminates the need for terminal connections whereby the beginnings of the wirings are connected across slots, and the ends of the wirings are connected across slots. Consequently, the aforementioned troubles are eliminated. When a plurality of insertion holes 58 are formed in the sealing sheet 56 as shown in FIG. 6, the performance of insulation between the leads 48 and the inner wall of the through hole 50 is secured by placing the geometrical center of the area where the insertion holes 58 is formed in correspondence with the center of the through hole 50. By using a plurality of insertion holes 58 as mentioned above, the large number of leads 48 that should be guided outside can be separated into individual leads 48. Therefore, the number of leads 48 inserted into a single insertion hole 58 is reduced. Advantageously, this helps prevent friction between the leads 48 and secure insulation, as well as facilitating the job of insertion.

FIG. 6B shows an example where it is ensured that the lead 48 is inserted into the insertion hole 58 with ease. As mentioned before, it is favorable that the diameter of the insertion hole 58 be equal to or slightly smaller than the wire diameter of the lead 48 in order to minimize the gap formed between the lead 48 and the insertion hole 58. Such provision may result in difficulty in inserting the lead 48 into the insertion hole 58 even if the sealing sheet 58 is flexible. This is addressed by forming a cut 64 extending from the end of sealing sheet 56 to the insertion hole 58. As a result, the movement of the lead 48 to the insertion hole 58 via the cut 64 is facilitated. The cut 64 may have a width equal to less than the thickness of the sealing sheet 56 and may be formed to extend from the insertion hole 58 to the end of the sealing sheet 56 continuously. The cut 64 can be closed again by the curable resin flowing in the process of curing. Thereby, creation of a gap that otherwise may cause air leak is prevented.

As described, the use of the sealing sheet 56 according to the embodiment enables using a simple structure to achieve a closed structure of the housing 20, structure for insulating the lead 48, and routing of the lead 48. Associated with this, the number of steps of manufacturing and the number of components can be reduced. In association with the simplified structure, the cost can be reduced accordingly.

While the embodiment has been described, by way of example, as using a thermosetting resin as a curable resin carried by the sealing sheet 56, any curable resin may be used so long as the resin is temporarily softened during a curing process and is cured afterwards. For example, ultraviolet-setting resin, photo-setting resin, moisture-setting resin, or additive-setting resin may be used and achieves the same advantage as the resin according to the embodiment.

In the exemplary disk drive device 10 described in the embodiment as incorporating the sealing sheet 56, the housing 20 is formed with the base plate 16, the chassis 12, and the cover 14 as shown in FIG. 1. The disk drive device may have other structures. For example, the inventive arrangement may also be applicable equally advantageously to a disk drive device of a type where the chassis 12 and the base plate 16 are integrated.

The embodiment described above is non-limiting and it will be obvious to those skilled in the art that various modifications could be developed based upon the knowledge of a skilled person. The structures illustrated in the drawings are by way of examples. Any structure capable of achieving the same function may also be applicable and still achieve the same advantage.

We claim:

1. A disk drive device comprising:
    a housing;
    a bearing unit provided in the housing and operative to rotatably support a recording disk with respect to the housing; and
    a drive unit operative to drive the recording disk supported by the bearing unit into rotation, wherein
    the housing is provided with a through hole that guides a lead from the drive unit outside the housing, and
    a sealing sheet formed with an insertion hole for guiding the lead that carries, on a base permeable to air due to a mesh structure or fiber structure, a curable resin temporarily softened during a curing process and cured afterwards, and that seals the insertion hole and the through hole so as to form a closed space in the housing.

2. The disk drive device according to claim 1, wherein the diameter of the insertion hole is substantially equal to the diameter of the lead inserted.

3. The disk drive device according to claim 1, wherein the base of the sealing sheet has elasticity.

4. The disk drive device according to claim 3, wherein the diameter of the insertion hole is equal to or smaller less than the diameter of the lead inserted.

5. The disk drive device according to claim 1, wherein a part of the sealing sheet is formed in conformity with the shape of the through hole so as to enter the through hole.

6. The disk drive device according to claim 1, wherein the sealing sheet is placed such that the center of the insertion hole formed in the sealing sheet corresponds to the center of the through hole of the housing.

7. The disk drive device according to claim 1, wherein the diameter of the insertion hole is sized so that a plurality of leads are bundled and guided through, and the insertion hole operates to bundle and secure a plurality of leads.

8. The disk drive device according to claim 1, wherein the insertion hole is provided with a filler for preventing the inflow of an out-gas from the sealing sheet installed in its place to the interior of the housing.

9. The disk drive device according to claim 1, wherein a cut that extends from the end of the sealing sheet to the insertion hole and that is closed by the curing of the curable resin is formed in the sealing sheet.

10. The disk drive device according to claim 1, wherein the sealing sheet is provided with a plurality of insertion holes so that a plurality of leads are separated before being inserted into the holes.

11. The disk drive device according to claim 1, wherein a cover sealing sheet carrying a curable resin on a base permeable to air, due to a mesh structure or fiber structure, is placed to cover the through hole and a part of the lead guided along the outer surface of the housing via the through hole, the curable resin being softened temporarily during a curing process and cured afterwards.

\* \* \* \* \*